US010416442B2

(12) United States Patent
Gao et al.

(10) Patent No.: US 10,416,442 B2
(45) Date of Patent: Sep. 17, 2019

(54) COLOR WHEEL AND LASER LIGHT SOURCE SYSTEM THEREOF

(71) Applicant: IVIEW DISPLAYS (SHENZHEN) COMPANY LTD., Shenzhen (CN)

(72) Inventors: Zhiqiang Gao, Hongkong (CN); Steve Yeung, Hongkong (CN); Yuan Zhao, Shenzhen (CN); Hongji Lai, Shenzhen (CN); Manying Ning, Shenzhen (CN)

(73) Assignee: IVIEW DISPLAYS (SHENZHEN) COMPANY LTD., Shenzhen, Guangdong (CN)

( * ) Notice: Subject to any disclaimer, the term of this patent is extended or adjusted under 35 U.S.C. 154(b) by 0 days.

(21) Appl. No.: 16/206,417

(22) Filed: Nov. 30, 2018

(65) Prior Publication Data
US 2019/0094522 A1 Mar. 28, 2019

Related U.S. Application Data

(63) Continuation of application No. PCT/CN2017/075612, filed on Mar. 3, 2017.

(30) Foreign Application Priority Data
Nov. 24, 2016 (CN) .......................... 201611049625.2

(51) Int. Cl.
*G02B 26/00* (2006.01)
*H04N 9/31* (2006.01)
(Continued)

(52) U.S. Cl.
CPC .......... *G02B 26/008* (2013.01); *F21S 10/007* (2013.01); *G02B 27/141* (2013.01);
(Continued)

(58) Field of Classification Search
CPC ... F21S 10/007; G02B 26/008; G02B 27/141; G02B 21/204; F21V 9/32; F21V 9/40;
(Continued)

(56) References Cited

U.S. PATENT DOCUMENTS 9,432,640 B2    8/2016   Chang et al.
9,651,220 B2    5/2017   Hoehmann
(Continued)

FOREIGN PATENT DOCUMENTS

CN    102566230 A    7/2012
CN    104252094 A    12/2014
(Continued)

OTHER PUBLICATIONS

International Search Report dated Aug. 10, 2017; PCT/CN2017/075612.

*Primary Examiner* — Bryon T Gyllstrom
*Assistant Examiner* — Colin J Cattanach
(74) *Attorney, Agent, or Firm* — IPro, PLLC; Na Xu

(57) ABSTRACT

A color wheel includes an inner ring, including translucent regions which are diagonally distributed; and an outer ring, including fluorescent regions and a translucent region, the fluorescent regions including green fluorescent regions and yellow fluorescent regions, the green fluorescent regions being diagonally distributed; wherein, the angles of the translucent regions of the inner ring are greater than or equal to the angles of the green fluorescent regions of the outer ring, the angle extension lines of the ring-shaped green fluorescent regions passing through the center of a circle fall within the ring-shaped translucent regions of the inner ring, such that the green light generated in the green fluorescent regions passes through the translucent regions after being
(Continued)

reflected, and the yellow light generated in the yellow fluorescent regions is projected to a red light filter after being reflected.

15 Claims, 1 Drawing Sheet

(51) Int. Cl.
  *G03B 21/20* (2006.01)
  *G02B 27/14* (2006.01)
  *F21S 10/00* (2006.01)
  *F21V 9/32* (2018.01)
  *F21V 9/40* (2018.01)
  *F21V 9/45* (2018.01)

(52) U.S. Cl.
  CPC ....... *G03B 21/204* (2013.01); *G03B 21/2066* (2013.01); *H04N 9/3114* (2013.01); *H04N 9/3158* (2013.01); *F21V 9/32* (2018.02); *F21V 9/40* (2018.02); *F21V 9/45* (2018.02)

(58) Field of Classification Search
  CPC .......... F21V 9/45; F21V 14/006; F21V 14/08; F21V 14/085; G03B 21/2066; H04N 9/3114; H04N 9/3158
  See application file for complete search history.

(56) References Cited

U.S. PATENT DOCUMENTS

| | | | | |
|---|---|---|---|---|
| 2003/0151836 A1* | 8/2003 | Davis | ................ | G02B 26/008 359/892 |
| 2012/0242912 A1* | 9/2012 | Kitano | ................ | H04N 9/3111 348/759 |
| 2013/0077176 A1* | 3/2013 | Ohtomo | ............... | G02B 26/008 359/634 |
| 2013/0088471 A1* | 4/2013 | Kitano | ................ | H04N 9/3114 345/208 |
| 2013/0235352 A1* | 9/2013 | Hsu | ........................ | G03B 21/14 353/31 |
| 2014/0118991 A1* | 5/2014 | Lin | ...................... | G02B 26/008 362/84 |
| 2015/0124429 A1* | 5/2015 | Hoehmann | ............... | F21V 9/40 362/84 |
| 2015/0354787 A1* | 12/2015 | Chang | ...................... | H04N 9/00 362/84 |
| 2016/0109789 A1 | 4/2016 | Zhao et al. | | |
| 2016/0274353 A1 | 9/2016 | Ando et al. | | |
| 2016/0377966 A1* | 12/2016 | Hsu | ........................ | G03B 33/00 362/84 |
| 2018/0007326 A1* | 1/2018 | Hadrath | ................ | G03B 21/16 |
| 2019/0094523 A1* | 3/2019 | Gao | ...................... | G03B 33/08 |

FOREIGN PATENT DOCUMENTS

| | | |
|---|---|---|
| CN | 104267569 A | 1/2015 |
| CN | 104298059 A | 1/2015 |
| CN | 104613418 A | 5/2015 |
| CN | 105353578 A | 2/2016 |
| CN | 105659160 A | 6/2016 |
| CN | 205450551 U | 8/2016 |
| CN | 205539893 U | 8/2016 |
| CN | 205608228 U | 9/2016 |
| CN | 106353959 A | 1/2017 |
| DE | 102013222431 A1 | 5/2015 |
| TW | 201546534 A | 12/2015 |
| TW | I530749 B | 4/2016 |
| WO | 2016062030 A1 | 4/2016 |

* cited by examiner

COLOR WHEEL AND LASER LIGHT SOURCE SYSTEM THEREOF

This disclosure is a continuation of International Patent Application No. PCT/CN2017/075612, filed on Mar. 3, 2017, which is based upon and claims priority to Chinese Patent Application No. 201611049625.2, filed on Nov. 24, 2016, the entire contents of which are incorporated herein by reference.

TECHNICAL FIELD

The present disclosure relates to the technical field of projection, and in particular, relates to a color wheel and a laser light source system thereof.

BACKGROUND

Related simulation studies show that under the premise of low red light saturation requirements, a double color wheel only improves the brightness by 9.5% compared with a single color wheel, and thus on some occasions the single color wheel can meet the user's needs.

A light source of a projector is generally a system that can generate three primary colors of red, green and blue lights. However, for the luminous efficiency of a solid-state light-emitting element, a blue solid-state light-emitting element generally has the best luminous efficiency, therefore, most of the current light sources are to excite light of various colors by adopting a blue solid-state light-emitting element cooperating with a fluorescent color wheel, instead of a method of directly emitting a red light by a red solid-state light-emitting element or emitting a green light by a green solid-state light-emitting element, thereby improving the luminous efficiency of a light source system. However, in order to improve the saturation of the light source, a corresponding filter is generally used for filtering. In the prior art, a blue light is used to excite a yellow light and a green light, and then a red light is generated through a red light filter.

SUMMARY

An embodiment of the present disclosure provides a color wheel, including an inner ring, including translucent regions which are diagonally distributed; and an outer ring, including fluorescent regions and a translucent region, the fluorescent regions including green fluorescent regions and yellow fluorescent regions, the green fluorescent regions being diagonally distributed; wherein, the angles of the translucent regions of the inner ring are greater than or equal to the angles of the green fluorescent regions of the outer ring, the angle extension lines of the ring-shaped green fluorescent regions passing through the center of a circle fall within the ring-shaped translucent regions of the inner ring, such that the green light generated in the green fluorescent regions passes through the translucent regions after being reflected, and the yellow light generated in the yellow fluorescent regions is projected to a red light filter after being reflected.

Another embodiment of the present disclosure provides a color wheel, including an outer ring, including translucent regions which are diagonally distributed; and an inner ring, including fluorescent regions and a translucent region, the fluorescent regions including green fluorescent regions and yellow fluorescent regions, the green fluorescent regions being diagonally distributed; wherein, the angles of the translucent regions of the outer ring are greater than or equal to the angles of the green fluorescent regions of the inner ring, the angle extension lines of the ring-shaped green fluorescent regions passing through the center of a circle fall within the ring-shaped translucent regions of the outer ring, such that the green light generated in the green fluorescent regions passes through the translucent regions after being reflected, and the yellow light generated in the yellow fluorescent regions is projected to a red light filter after being reflected.

Still another embodiment of the present disclosure provides a laser light source system, including a light source excitation unit capable of generating a laser, a reflecting mirror group, a dichroic mirror group, a color wheel, a beam adjustment unit and a filter, wherein the reflecting mirror group includes a first reflecting mirror, a second reflecting mirror and a third reflecting mirror, all of which are able to reflect light of all colors; the dichroic mirror group includes a first dichroic mirror, a second dichroic mirror, a third dichroic mirror and a fourth dichroic mirror, wherein the first dichroic mirror reflects a blue light and transmits a yellow light and a green light; the second dichroic mirror reflects a green light and transmits a blue light; the third dichroic mirror reflects a red light and transmits a blue light and a green light; and the fourth dichroic mirror reflects a green light and transmits a yellow light; the first reflecting mirror, the second reflecting mirror, the third dichroic mirror and the third reflecting mirror define a rectangle and are positioned at four vertex positions of the rectangle respectively, the second dichroic mirror is positioned between the first reflecting mirror and the second reflecting mirror, the fourth dichroic mirror is positioned between the third dichroic mirror and the third reflecting mirror, and the first dichroic mirror is positioned between the first reflecting mirror and the third reflecting mirror; the filter is a red light filter positioned between the third dichroic mirror and the fourth dichroic mirror; the color wheel is positioned between the first dichroic mirror and the first reflecting mirror; the color wheel includes an inner ring, including translucent regions which are diagonally distributed; and an outer ring, including fluorescent regions and a translucent region, the fluorescent regions including green fluorescent regions and yellow fluorescent regions, the green fluorescent regions being diagonally distributed; wherein, the angles of the translucent regions of the inner ring are greater than or equal to the angles of the green fluorescent regions of the outer ring, the angle extension lines of the ring-shaped green fluorescent regions passing through the center of a circle fall within the ring-shaped translucent regions of the inner ring, such that the green light generated in the green fluorescent regions passes through the translucent regions after being reflected, and the yellow light generated in the yellow fluorescent regions is projected to the red light filter after being reflected.

Still another embodiment of the present disclosure provides a laser light source system, including a light source excitation unit capable of generating a laser, a reflecting mirror group, a dichroic mirror group, a color wheel, a beam adjustment unit and a filter, wherein the reflecting mirror group includes a first reflecting mirror, a second reflecting mirror and a third reflecting mirror, all of which are able to reflect light of all colors; the dichroic mirror group includes a first dichroic mirror, a second dichroic mirror, a third dichroic mirror and a fourth dichroic mirror, wherein the first dichroic mirror reflects a blue light and transmits a yellow light and a green light; the second dichroic mirror reflects a green light and transmits a blue light; the third dichroic mirror reflects a red light and transmits a blue light and a green light; and the fourth dichroic mirror reflects a green light and transmits a yellow light; the first reflecting mirror, the second reflecting mirror, the third dichroic mirror and the third reflecting mirror define a rectangle and are positioned at four vertex positions of the rectangle respectively, the second dichroic mirror is positioned between the first reflecting mirror and the second reflecting mirror, the fourth dichroic mirror is positioned between the third dichroic mirror and the third reflecting mirror, and the first dichroic mirror is positioned between the first reflecting mirror and the third reflecting mirror; the filter is a red light filter positioned between the third dichroic mirror and the fourth dichroic mirror; the color wheel is positioned between the first dichroic mirror and the first reflecting mirror; the color wheel includes an outer ring, including translucent regions which are diagonally distributed; and an inner ring, including fluorescent regions and a translucent region, the fluorescent regions including green fluorescent regions and yellow fluorescent regions, the green fluorescent regions being diagonally distributed; wherein, the angles of the translucent regions of the outer ring are greater than or equal to the angles of the green fluorescent regions of the inner ring, the angle extension lines of the ring-shaped green fluorescent regions passing through the center of a circle fall within the ring-shaped translucent regions of the outer ring, such that the green light generated in the green fluorescent regions passes through the translucent regions after being reflected, and the yellow light generated in the yellow fluorescent regions is projected to the red light filter after being reflected.

DETAILED DESCRIPTION

Figure 1:
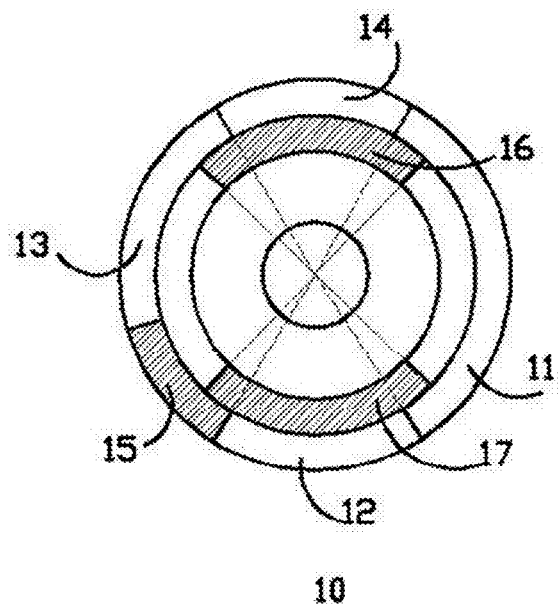
FIG. 1 is a front view of a color wheel according to the present disclosure.

FIG. 1 is a front view of a color wheel according to the present disclosure. The color wheel 10 includes an inner ring and an outer ring. Wherein, the inner ring includes translucent regions spaced apart, namely a first green light translucent region 16 and a second green light translucent region 17. The outer ring includes yellow fluorescent regions, green fluorescent regions and a blue light translucent region 15, wherein the yellow fluorescent regions include a first yellow fluorescent region 11 and a second yellow fluorescent region 13, and the green fluorescent regions include a first green fluorescent region 12 and a second green fluorescent region 14. The blue light translucent region 15 is positioned between the first green fluorescent region 12 and the second yellow fluorescent region 13, but is not limited thereto, and may be positioned between the first green fluorescent region 12 and the first yellow fluorescent region 11, or between the second green fluorescent region 14 and the second yellow fluorescent region 13, or between the second green fluorescent region 14 and the first yellow fluorescent region 11. There may further be a plurality of blue light translucent regions 15, which may be positioned between a green fluorescent region and a yellow fluorescent region, or may be positioned between the yellow fluorescent regions to divide the yellow fluorescent regions.

The first green light translucent region 16 and the second green light translucent region 17 are diagonally distributed, and the first green fluorescent region 12 and the second green fluorescent region 14 are diagonally distributed. The angle of the first green light translucent region 16 is greater than or equal to the angle of the second green fluorescent region 14, and the angle of the second green light translucent region 17 is greater than or equal to the angle of the first green fluorescent region 12, that is, the angle extension line of the first green fluorescent region 12 passing through the center of a circle falls within the range of the second green light translucent region 17, and the angle extension line of the second green fluorescent region 14 passing through the center of the circle falls within the range of the first green light translucent region 16. The entire inner ring may also be all set as a green light translucent region, that is, the first green light translucent region 16 and the second green light translucent region 17 are combined into an annular translucent region. When a blue laser is applied to the green fluorescent region of the outer ring of the color wheel 10, a green light is generated. As the green light translucent region is at a diagonal position of the green fluorescent region, so that the generated green light passes through the color wheel 10 via the green light translucent region after being reflected.

The first green light translucent region 16, the second green light translucent region 17 and the blue light translucent region 15 described above may be translucent glass coated with an antireflective film and/or through holes.

Although the color wheel including a pair of green fluorescent regions 12 and 14 and a pair of green light translucent regions 16 and 17 has been described above (refer to FIG. 1), the present disclosure is not limited thereto, and the color wheel may include a plurality of pairs of green fluorescent regions and a plurality of corresponding pairs of green light translucent regions. As a result, each pair of green fluorescent regions is diagonally distributed, and each pair of green light translucent regions is diagonally distributed. Further, the angle of each pair of green light translucent regions is greater than or equal to the angle of the corresponding pair of green fluorescent regions, that is, the angle extension line of each pair of green fluorescent regions passing through the center of the circle falls within the range of the corresponding pair of green light translucent regions. Correspondingly, the outer ring of the color wheel includes a plurality of yellow fluorescent regions, such that the plurality of yellow fluorescent regions and the plurality of pairs of green fluorescent regions are alternately distributed.

The color wheel including the inner ring having the translucent regions and the outer ring having the fluorescent regions and the translucent region has been described above, but is not limited thereto, and the present disclosure is also applicable to the color wheel in which the structures of the inner ring and the outer ring are interchanged. That is, a color wheel includes an outer ring having translucent regions and an inner ring having fluorescent regions and a translucent region, wherein, the fluorescent regions of the inner ring include green fluorescent regions and yellow fluorescent regions, wherein the green fluorescent regions are diagonally distributed, and the translucent regions of the outer ring are diagonally distributed. The angles of the translucent regions of the outer ring are greater than or equal to the angles of the green fluorescent regions of the inner ring, that is, the angle extension lines of the ring-shaped green fluorescent regions passing through the center of the circle fall within the ring-shaped translucent regions of the outer ring.

Figure 2:
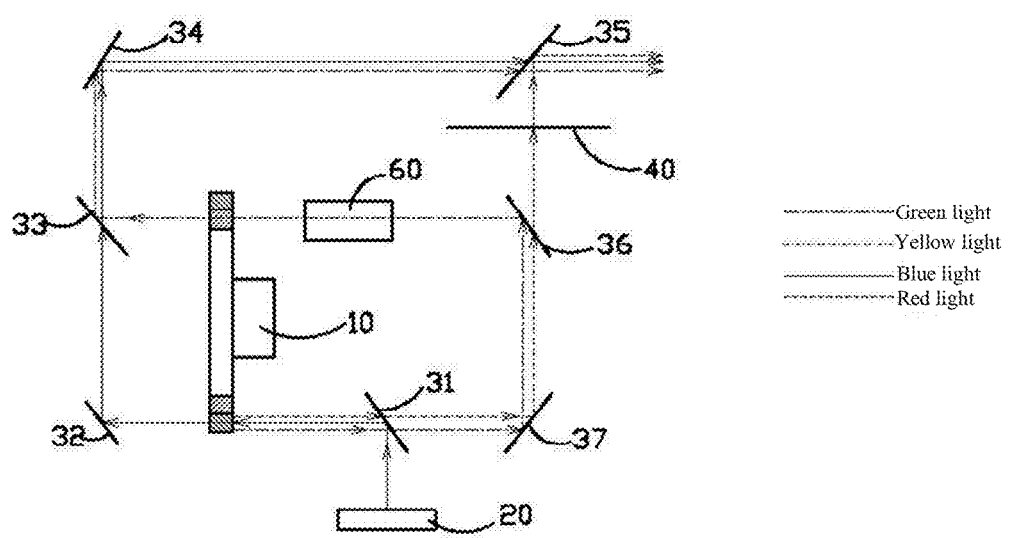
FIG. 2 is a schematic structural view of a laser light source system according to the present disclosure.

FIG. 2 is a schematic structural view of a laser light source system according to the present disclosure. The laser light source system includes a color wheel 10 as described above, a light source excitation unit 20 capable of generating a blue laser, a reflecting mirror group, a dichroic mirror group, a red light filter 40 and a beam adjustment unit 60.

Wherein, the reflecting mirror group includes a first reflecting mirror 32, a second reflecting mirror 34 and a third reflecting mirror 37. All of the first reflecting mirror 32, the second reflecting mirror 34 and the third reflecting mirror 37 are able to reflect lights of all colors.

The dichroic mirror group includes a first dichroic mirror 31, a second dichroic mirror 33, a third dichroic mirror 35 and a fourth dichroic mirror 36. Wherein, the first dichroic mirror 31 reflects a blue light and transmits a yellow light and a green light; the second dichroic mirror 33 reflects a green light and transmits a blue light; the third dichroic mirror 35 reflects a red light and transmits a blue light and a green light; and the fourth dichroic mirror 36 reflects a green light and transmits a yellow light.

The first reflecting mirror 32, the second reflecting mirror 34, the third dichroic mirror 35 and the third reflecting mirror 37 define a rectangle and are located at four vertex positions of the rectangle respectively. The second dichroic mirror 33 is positioned between the first reflecting mirror 32 and the second reflecting mirror 34, the first dichroic mirror 31 is positioned between the first reflecting mirror 32 and the third reflecting mirror 37, and the fourth dichroic mirror 36 is positioned between the third reflecting mirror 37 and the third dichroic mirror 35. The red light filter 40 is positioned between the fourth dichroic mirror 36 and the third dichroic mirror 35. The color wheel 10 is positioned between the first dichroic mirror 31 and the first reflecting mirror 32, and the beam adjustment unit 60 is positioned between the color wheel 10 and the fourth dichroic mirror 36. The blue light reflected by the first dichroic mirror 31 is projected to the outer ring of the color wheel 10, and the green light reflected by the fourth dichroic mirror 36 is projected to the inner ring of the color wheel 10 through the beam adjustment unit 60.

The light source excitation unit 20 emits a blue light, and the blue light is reflected by the first dichroic mirror 31 to reach the outer ring of the color wheel 10. When the blue light comes into contact with the blue light translucent region 15 of the outer ring of the color wheel 10, the blue light passes through the color wheel 10 to reach the first reflecting mirror 32. Then, the blue light is reflected to the second dichroic mirror 33, transmitted to the second reflecting mirror 34, reflected to the third dichroic mirror 35, and finally transmitted out of the light source system.

When the blue light comes into contact with the green fluorescent region of the outer ring of the color wheel 10, a green light is generated and reflected. The reflected green light is then transmitted through the first dichroic mirror 31 and reflected by the third reflecting mirror 37 to the fourth dichroic mirror 36. The fourth dichroic mirror 36 reflects the green light to the beam adjustment unit 60. After passing through the beam adjustment unit 60, the green light reaches and passes through the green light translucent region in the inner ring of the color wheel 10, and then is reflected by the second dichroic mirror 33 and the second reflecting mirror 34 to the third dichroic mirror 35, and finally transmitted out of the light source system. Wherein, a collimating lens group or a collecting lens group is selected for the green light reaching the beam adjustment unit 60 according to the structural size requirement of the light source system. When the light source system requires a compact structure, the collecting lens group is selected, to reduce the angle of the beam, thereby reducing the area of the color wheel 10. When the light source system requires a higher brightness effect and the space is sufficient, the collimating lens group is selected to obtain a better brightness effect.

When the blue light comes into contact with the yellow fluorescent region of the outer ring of the color wheel 10, a yellow light is generated and reflected. The reflected yellow light is then transmitted through the first dichroic mirror 31, reflected by the third reflecting mirror 37, and transmitted through the fourth dichroic mirror 36 to reach the red light filter 40. The yellow light reaching the red light filter 40 is filtered by the red light filter 40 to generate a red light, and the red light is reflected out of the light source system by the third dichroic mirror 35.

Therefore, the entire light source system sequentially outputs three primary colors of blue, green and red light.

The present disclosure has the beneficial effects that by the adoption of the color wheel and the laser light source system thereof according to the present disclosure, the three primary colors of the light source can be generated efficiently, meanwhile, by filtering out the red light after separating the yellow light and the green light, the energy of the green light is effectively preserved.

It should be noted that the preferred embodiments of the present disclosure are given in the specification of the present disclosure and the accompanying drawings thereof, but the present disclosure can be implemented in many different forms, and is not limited to the embodiments described in the specification. These embodiments are not intended to be an additional limitation on the content of the present disclosure, and these embodiments are provided to make the understanding of the disclosure of the present disclosure more comprehensive. Besides, the above technical features are further combined with each other to form various embodiments that are not listed above, which are considered to be within the scope of the specification of the present disclosure; further, those of ordinary skills in the art can carry out improvements or changes according to the above description. All such improvements and changes should be included within the protective scope of the appended claims of this disclosure.

What is claimed is:

1. A color wheel, comprising:
   an inner ring, comprising translucent regions which are diagonally distributed; and
   an outer ring, comprising fluorescent regions and a translucent region, the fluorescent regions comprising green fluorescent regions and yellow fluorescent regions, the green fluorescent regions being diagonally distributed;
   wherein, the angles of the translucent regions of the inner ring are greater than or equal to the angles of the green fluorescent regions of the outer ring, the angle extension lines of the ring-shaped green fluorescent regions passing through the center of a circle fall within the ring-shaped translucent regions of the inner ring, such that the green light generated in the green fluorescent regions passes through the translucent regions after being reflected, and the yellow light generated in the yellow fluorescent regions is projected to a red light filter after being reflected.

2. The color wheel according to claim 1, wherein the yellow fluorescent regions comprise a first yellow fluorescent region and a second yellow fluorescent region, and the green fluorescent regions comprise a first green fluorescent region and a second green fluorescent region; the first green fluorescent region and the second green fluorescent region are diagonally distributed, and the first yellow fluorescent region, the first green fluorescent region, the second yellow fluorescent region and the second green fluorescent region are alternately distributed.

3. The color wheel according to claim 1, wherein the translucent region of the outer ring is located between a green fluorescent region and a yellow fluorescent region.

4. The color wheel according to claim 1, wherein the fluorescent regions of the outer ring comprises a plurality of yellow fluorescent regions and a plurality of pairs of diagonally distributed green fluorescent regions, the yellow fluorescent regions and the green fluorescent regions being alternately distributed.

5. A color wheel, comprising:
an outer ring, comprising translucent regions which are diagonally distributed; and
an inner ring, comprising fluorescent regions and a translucent region, the fluorescent regions comprising green fluorescent regions and yellow fluorescent regions, the green fluorescent regions being diagonally distributed;
wherein, the angles of the translucent regions of the outer ring are greater than or equal to the angles of the green fluorescent regions of the inner ring, the angle extension lines of the ring-shaped green fluorescent regions passing through the center of a circle fall within the ring-shaped translucent regions of the outer ring, such that the green light generated in the green fluorescent regions passes through the translucent regions after being reflected, and the yellow light generated in the yellow fluorescent regions is projected to a red light filter after being reflected.

6. A laser light source system, comprising a light source excitation unit capable of generating a laser, a reflecting mirror group, a dichroic mirror group, a color wheel, a beam adjustment unit and a filter,
wherein the reflecting mirror group comprises a first reflecting mirror, a second reflecting mirror and a third reflecting mirror, all of which are able to reflect light of all colors;
the dichroic mirror group comprises a first dichroic mirror, a second dichroic mirror, a third dichroic mirror and a fourth dichroic mirror, wherein the first dichroic mirror reflects a blue light and transmits a yellow light and a green light; the second dichroic mirror reflects a green light and transmits a blue light; the third dichroic mirror reflects a red light and transmits a blue light and a green light; and the fourth dichroic mirror reflects a green light and transmits a yellow light;
the first reflecting mirror, the second reflecting mirror, the third dichroic mirror and the third reflecting mirror define a rectangle and are positioned at four vertex positions of the rectangle respectively, the second dichroic mirror is positioned between the first reflecting mirror and the second reflecting mirror, the fourth dichroic mirror is positioned between the third dichroic mirror and the third reflecting mirror, and the first dichroic mirror is positioned between the first reflecting mirror and the third reflecting mirror;
the filter is a red light filter positioned between the third dichroic mirror and the fourth dichroic mirror;
the color wheel is positioned between the first dichroic mirror and the first reflecting mirror;
the color wheel comprises an inner ring, comprising translucent regions which are diagonally distributed; and
an outer ring, comprising fluorescent regions and a translucent region, the fluorescent regions comprising green fluorescent regions and yellow fluorescent regions, the green fluorescent regions being diagonally distributed;
wherein, the angles of the translucent regions of the inner ring are greater than or equal to the angles of the green fluorescent regions of the outer ring, the angle extension lines of the ring-shaped green fluorescent regions passing through the center of a circle fall within the ring-shaped translucent regions of the inner ring, such that the green light generated in the green fluorescent regions passes through the translucent regions after being reflected, and the yellow light generated in the yellow fluorescent regions is projected to the red light filter after being reflected.

7. The laser light source system according to claim 6, wherein the beam adjustment unit is a collimating lens group.

8. The laser light source system according to claim 6, wherein the beam adjustment unit is a collecting lens group that can reduce the beam angle.

9. The laser light source system according to claim 6, wherein the blue light reflected by the first dichroic mirror is projected on the outer ring of the color wheel.

10. The laser light source system according to claim 9, wherein the green light reflected by the fourth dichroic mirror is projected on the inner ring of the color wheel.

11. A laser light source system, comprising a light source excitation unit capable of generating a laser, a reflecting mirror group, a dichroic mirror group, a color wheel, a beam adjustment unit and a filter,
wherein the reflecting mirror group comprises a first reflecting mirror, a second reflecting mirror and a third reflecting mirror, all of which are able to reflect light of all colors;
the dichroic mirror group comprises a first dichroic mirror, a second dichroic mirror, a third dichroic mirror and a fourth dichroic mirror, wherein the first dichroic mirror reflects a blue light and transmits a yellow light and a green light; the second dichroic mirror reflects a green light and transmits a blue light; the third dichroic mirror reflects a red light and transmits a blue light and a green light; and the fourth dichroic mirror reflects a green light and transmits a yellow light;
the first reflecting mirror, the second reflecting mirror, the third dichroic mirror and the third reflecting mirror define a rectangle and are positioned at four vertex positions of the rectangle respectively, the second dichroic mirror is positioned between the first reflecting mirror and the second reflecting mirror, the fourth dichroic mirror is positioned between the third dichroic mirror and the third reflecting mirror, and the first dichroic mirror is positioned between the first reflecting mirror and the third reflecting mirror;
the filter is a red light filter positioned between the third dichroic mirror and the fourth dichroic mirror;
the color wheel is positioned between the first dichroic mirror and the first reflecting mirror;
the color wheel comprises an outer ring, comprising translucent regions which are diagonally distributed; and
an inner ring, comprising fluorescent regions and a translucent region, the fluorescent regions comprising green fluorescent regions and yellow fluorescent regions, the green fluorescent regions being diagonally distributed;
wherein, the angles of the translucent regions of the outer ring are greater than or equal to the angles of the green fluorescent regions of the inner ring, the angle extension lines of the ring-shaped green fluorescent regions passing through the center of a circle fall within the ring-shaped translucent regions of the outer ring, such that the green light generated in the green fluorescent regions passes through the translucent regions after being reflected, and the yellow light generated in the yellow fluorescent regions is projected to the red light filter after being reflected.

12. The laser light source system according to claim 11, wherein the beam adjustment unit is a collimating lens group.

13. The laser light source system according to claim 11, wherein the beam adjustment unit is a collecting lens group that can reduce the beam angle.

14. The laser light source system according to claim 11, wherein the blue light reflected by the first dichroic mirror is projected on the inner ring of the color wheel.

15. The laser light source system according to claim 14, wherein the green light reflected by the fourth dichroic mirror is projected on the outer ring of the color wheel.

* * * * *